US012808711B2

(12) United States Patent
Kasamatsu

(10) Patent No.: US 12,808,711 B2
(45) Date of Patent: Nov. 24, 2026

(54) WATERPROOF MECHANISM FOR WEIGHING APPARATUS

(71) Applicant: A&D Company, Limited, Tokyo (JP)

(72) Inventor: Shunsuke Kasamatsu, Kitamoto (JP)

(73) Assignee: A&D Company, Limited, Tokyo (JP)

( * ) Notice: Subject to any disclaimer, the term of this patent is extended or adjusted under 35 U.S.C. 154(b) by 394 days.

(21) Appl. No.: 18/718,763

(22) PCT Filed: Dec. 17, 2021

(86) PCT No.: PCT/JP2021/046702
§ 371 (c)(1),
(2) Date: Nov. 22, 2024

(87) PCT Pub. No.: WO2023/112301
PCT Pub. Date: Jun. 22, 2023

(65) Prior Publication Data
US 2025/0354855 A1 Nov. 20, 2025

(51) Int. Cl.
*G01G 21/30* (2006.01)
*G01G 21/28* (2006.01)

(52) U.S. Cl.
CPC ............. *G01G 21/30* (2013.01); *G01G 21/28* (2013.01)

(58) Field of Classification Search
CPC ............................... G01G 21/28; G01G 21/30
See application file for complete search history.

(56) References Cited

U.S. PATENT DOCUMENTS 6,407,351 B1 * 6/2002 Meyer ...................... F16M 7/00 248/188.4
10,564,030 B2 * 2/2020 Schulzki ............... G01G 21/30
2001/0027882 A1 10/2001 Iseli
2003/0067119 A1 * 4/2003 Burkhard .............. G01G 21/30 277/412

(Continued)

FOREIGN PATENT DOCUMENTS

DE 10 2006 012841 A1 9/2007
JP H02-5039 U 1/1990

(Continued)

OTHER PUBLICATIONS

Computer translation of WO_2016170675_A1 (Year: 2026).*

*Primary Examiner* — Randy W Gibson
(74) *Attorney, Agent, or Firm* — Studebaker Brackett PLLC

(57) ABSTRACT

A waterproof mechanism for a weighing apparatus includes a weighing pan, a mass sensor to which a load of the weighing pan is transmitted, a device case configured to house the mass sensor, a pan boss configured to support the weighing pan higher than the device case, and a pan boss circumferential member provided in a circumferential direction of the pan boss and fixed to the device case, wherein the weighing pan includes a side wall portion provided continuoulsy downward from a pan portion rim, and when the weighing pan is lowered downward by a prescribed amount, the side wall portion engages with the pan boss circumferential member in the circumferential direction, and a lower surface of the pan portion and an upper surface of the pan boss circumferential member come into contact with each other.

20 Claims, 7 Drawing Sheets

(56) References Cited

U.S. PATENT DOCUMENTS

| | | | | |
|---|---|---|---|---|
| 2005/0217902 | A1 * | 10/2005 | Emery | G01G 21/30<br>177/180 |
| 2010/0236842 | A1 * | 9/2010 | Hauck | G01G 21/30<br>177/210 EM |
| 2014/0353050 | A1 * | 12/2014 | Schulzki | G01G 21/28<br>177/239 |
| 2018/0103617 | A1 * | 4/2018 | Izumo | A01K 29/00 |

FOREIGN PATENT DOCUMENTS

| | | | | |
|---|---|---|---|---|
| JP | 2001-349770 | A | 12/2001 | |
| JP | 2003-207385 | A | 7/2003 | |
| JP | 2003-232672 | A | 8/2003 | |
| JP | 2013-011489 | A | 1/2013 | |
| WO | WO-2016170675 | A1 * | 10/2016 | G01G 17/08 |

* cited by examiner

WATERPROOF MECHANISM FOR WEIGHING APPARATUS

TECHNICAL FIELD

The present invention relates to a waterproof mechanism for a weighing apparatus.

BACKGROUND ART

A balance as a weighing apparatus includes a mass sensor inside a device case of the balance, and transmits a load applied to a weighing pan and weighs the load. To waterproof the area around the weighing pan so as to prevent water intrusion into the mass sensor, the following means are known.

(1) Closely sealing a junction portion between the weighing pan and the mass sensor to provide constant waterproofing.

(2) Closely sealing the junction portion between the weighing pan and the mass sensor only at the time of cleaning of the balance.

With respect to (1) described above, as described in Patent Literature 1, one that covers the junction portion with a diaphragm is well known. With respect to (2) described above, one that covers the junction portion by a dedicated rubber cap is well known. Alternatively, there is also a configuration described in Patent Literature 2 which includes a structure capable of supplying an air pressure to the junction portion, and introduces air at the time of cleaning to closely seal the portion between the weighing pan and the mass sensor.

CITATION LIST

Patent Literatures

Patent Literature 1: Japanese Published Unexamined Patent Application No. 2013-11489

Patent Literature 2: Japanese Published Unexamined Patent Application No. 2001-349770

SUMMARY OF INVENTION

Technical Problem

The constant waterproof mechanism using a diaphragm has a problem in which the width (size) of the apparatus needs to be as large as the diameter of the diaphragm. Moreover, there is a problem with the diaphragm in that, for example, when the balance has a minimum display of 0.1 mg or less, variation occurs due to pressure fluctuations in the diaphragm at the time of weighing, and a weighed value is not stable, although such a problem does not occur at the time of cleaning. The waterproof mechanism using a rubber cap and the waterproof mechanism using an air pressure require a rubber cap or a pneumatic jig that is necessary only at the time of cleaning, and there are problems with the risk of losing them and the inconvenience of managing them.

The present invention was made to solve the problems described above, and an object thereof is to provide a waterproof mechanism that waterproofs a mass sensor of a weighing apparatus without using a diagram or a dedicated jig.

Solution to Problem

In order to solve the problems described above, a waterproof mechanism for a weighing apparatus according to an aspect of the present invention includes a weighing pan, a mass sensor to which a load of the weighing pan is transmitted, a device case configured to house the mass sensor, a pan boss configured to support the weighing pan higher than the device case, and a pan boss circumferential member provided in a circumferential direction of the pan boss and fixed to the device case, wherein the weighing pan includes a side wall portion provided continuously downward from a pan portion rim, and when the weighing pan is lowered downward by a prescribed amount, the side wall portion engages with the pan boss circumferential member in the circumferential direction, and a lower surface of the pan portion and an upper surface of the pan boss circumferential member come into contact with each other.

In the aspect described above, it is also preferable that on the upper surface of the pan boss circumferential member and a contact surface of the pan boss circumferential member which comes into contact with the device case, waterproofing materials are respectively disposed in the circumferential direction.

In the aspect described above, it is also preferable that an inner side surface of the side wall portion and an outer side surface of the pan boss circumferential member include threaded portions that engage with each other, and the side wall portion and the pan boss circumferential member make the engagement by turning the weighing pan in a screw direction.

In the aspect described above, it is also preferable that a lower end portion of an inner side surface of the side wall portion and an outer side surface of the pan boss circumferential member include engagement portions configured to make concavo-convex engagement with each other, and the side wall portion and the pan boss circumferential member make the engagement by their concavity and convexity.

In the aspect described above, it is also preferable that an outer side surface of the pan boss circumferential member includes a first outer side surface configured to guide lowering of the side wall portion, and a second outer side surface having a diameter larger than that of the first outer side surface and positioned lower than the first outer side surface, and by a step between the first outer side surface and the second outer side surface, the lowering of the side wall portion is restricted, and the waterproofing material is prevented from being excessively crushed.

In the aspect described above, it is also preferable that when an overload is applied to the weighing pan, a lower end portion of the side wall portion interferes with the outer side surface of the pan boss circumferential member and prevents the overload from being transmitted to the mass sensor.

In the aspect described above, it is also preferable that the waterproof mechanism for a weighing apparatus includes an elastic body configured to bias the pan boss in a direction away from a pan receiver of the pan boss between the pan boss and the pan receiver, and the elastic body is combined with an overload prevention mechanism configured to space the pan boss away from the pan receiver to release the load.

In the aspect described above, it is also preferable that when the weighing pan is lowered by the prescribed amount and the engagement is made, the weighing pan is fixed to the pan boss circumferential member, and the pan boss circumferential member serves as a stopper of the weighing pan at the time of transportation of the apparatus.

Advantageous Effects of Invention

According to the present invention, a waterproof mechanism that waterproofs a mass sensor of a weighing apparatus without using a diaphragm or a dedicated jig can be provided.

BRIEF DESCRIPTION OF DRAWINGS

FIGS. 1A, 1B, and 1C are views illustrating a weighing apparatus including a waterproof mechanism for a weighing apparatus according to a first embodiment of the present invention, of which FIG. 1A is a plan view of the weighing apparatus, FIG. 1B is a left side view of the weighing apparatus, and FIG. 1C is a longitudinal sectional view of the weighing apparatus.

DESCRIPTION OF EMBODIMENTS

Next, preferred embodiments of the present invention will be described based on the drawings. In the following description of the embodiments, the same configurations are provided with the same reference signs, and overlapping descriptions are omitted.

1. First Embodiment

Figure 1A:
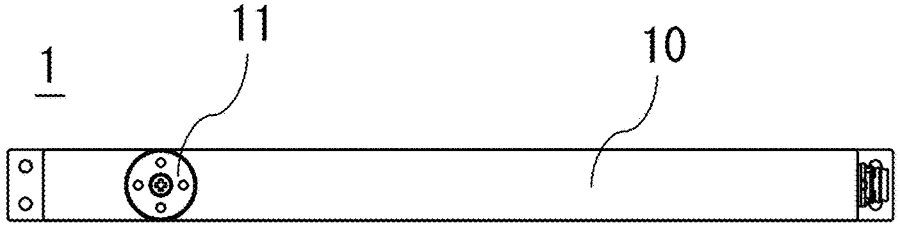
Figure 1B:
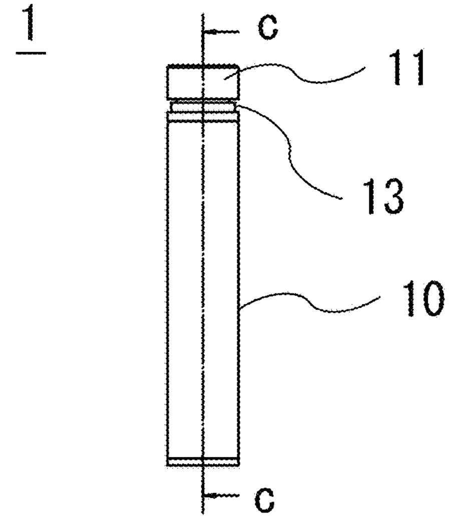
Figure 1C:
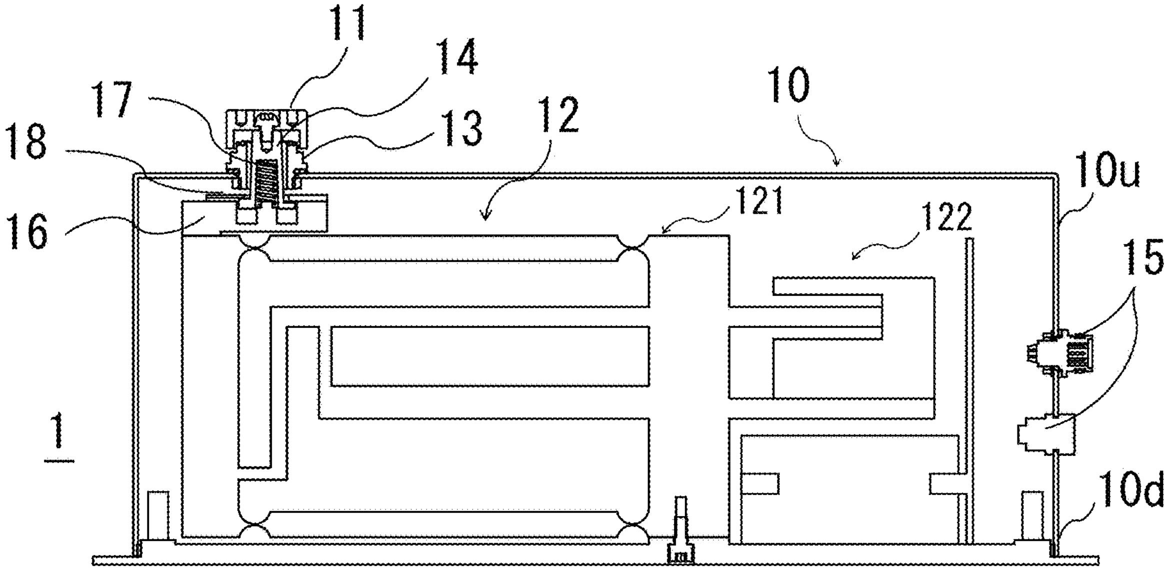

FIGS. 1A, 1B, and 1C are views illustrating a "weighing apparatus" including a waterproof mechanism for a weighing apparatus according to a first embodiment, of which FIG. 1A is a plan view of the weighing apparatus, FIG. 1B is a left side view of the weighing apparatus, and FIG. 1C is a longitudinal sectional view (sectional view taken along c-c shown in FIG. 1B) of the weighing apparatus.

The reference sign 1 represents a weighing apparatus, and the weighing apparatus 1 is an electronic balance (hereinafter referred to as a balance 1). The balance 1 includes a device case 10, a weighing pan 11, a mass sensor 12, and a pan boss circumferential member 13.

The device case 10 is formed by aluminum die-casting, zinc die-casting, or made of stainless steel. The device case 10 has a divided structure including an upper case 10*u* and a lower case 10*d*, and the upper case 10*u* and the lower case 10*d* are fitted in a state of interposing a sealing material such as a packing therebetween. To the upper case 10*u*, a waterproof connector 15 is fixedly fitted, and a power supply cable and an RS232C cable, etc., are attached.

The mass sensor 12 is housed in the device case 10. The mass sensor 12 includes a Roberval mechanism 121 and a sensor main body 122. The Roberval mechanism 121 is a structure for transmitting a load applied to the weighing pan 11 to the sensor main body 122, and is a publicly known one including a floating portion that is formed of a rectangular metal block and receives a load from the weighing pan 11, a fixed portion to be fixed to the device case 10, upper and lower sub rods connecting the floating portion and the fixed portion, and a load transmitting portion that transmits a load applied to the floating portion to the sensor main body 122. As the sensor main body 122, an electromagnetic balance type sensor is illustrated as an example in the present embodiment, however, without limitation to this, it may be, for example, a strain gauge type or capacitance type sensor.

As illustrated in FIG. 1C, the weighing pan 11 is supported from below by the Roberval mechanism 121 via a pan boss 14 having an upward projecting shape, and is disposed higher than the device case 10. To the floating portion of the Roberval mechanism 121, a pan receiver 16 having a recess portion in which a lower end portion of the pan boss 14 is accommodated is fixed.

Between the pan boss 14 and the pan receiver 16, an elastic body 17 that biases the pan boss 14 in a direction away from the pan receiver 16 is disposed. The pan boss 14 is biased by the elastic body 17, and disposed in a state where the pan boss 14 is locked by a pan boss presser 18 disposed on an upper surface of the pan receiver 16. When an overload is applied to the weighing pan 11, the pan boss 14 sinks down, and the pan boss 14 and the pan receiver 16 are spaced away from each other by the elastic body 17, so that the overload is not transmitted to the mass sensor 12. These pan boss 14, elastic body 17, pan receiver 16, and pan boss presser 18 constitute a known overload prevention mechanism. For details, reference may be made to Japanese Patent No. 6414864.

Figure 2:
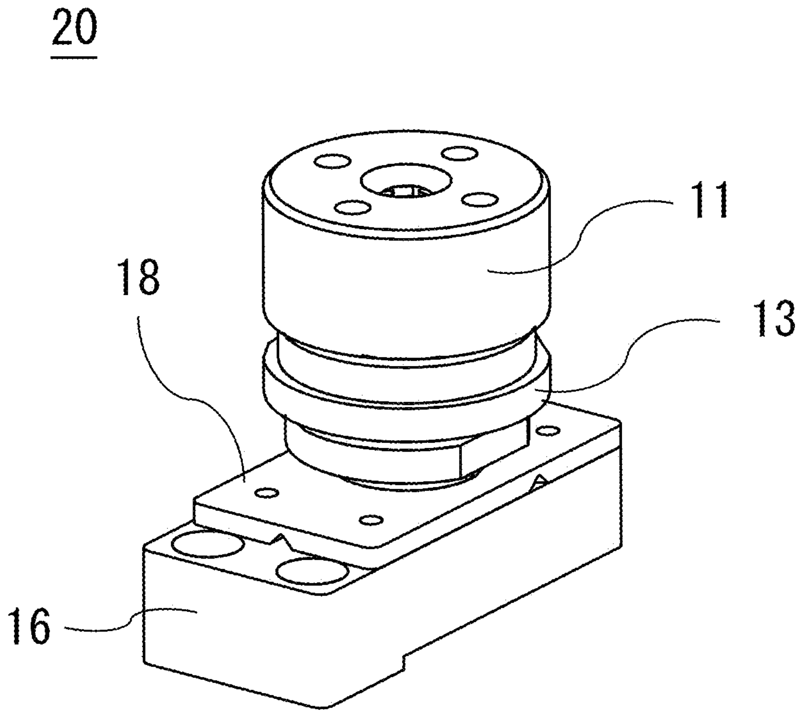
FIG. 2 is a perspective view of the same waterproof mechanism for a weighing apparatus.
Figure 5:
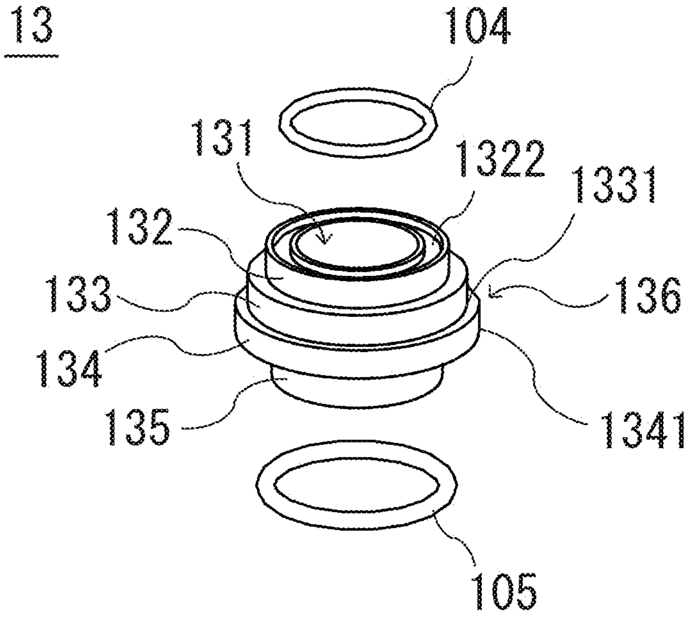
FIG. 5 is a perspective view of a pan boss circumferential member of the same waterproof mechanism for a weighing apparatus.
Figure 6:
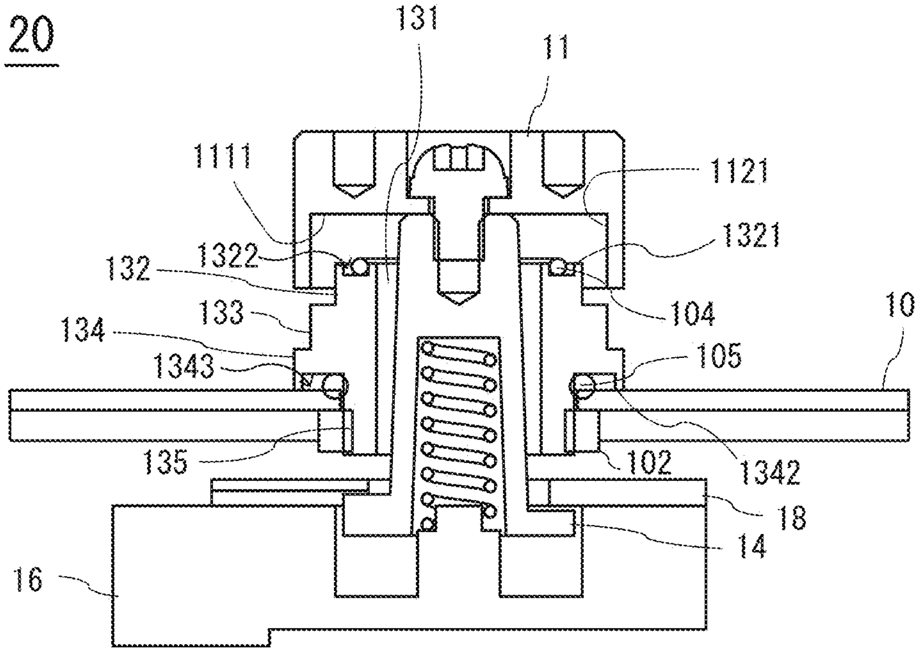
FIG. 6 is a longitudinal sectional view after the same waterproof mechanism for a weighing apparatus is assembled.

Next, the "waterproof mechanism" of the present embodiment will be described. FIG. 2 is a perspective view of the waterproof mechanism for a weighing apparatus according to the first embodiment, FIG. 3 is an exploded perspective view of the same waterproof mechanism for a weighing apparatus, FIG. 4 is a perspective view of a weighing pan of the same waterproof mechanism for a weighing apparatus, FIG. 5 is a perspective view of a pan boss circumferential member of the same waterproof mechanism for a weighing apparatus, and FIG. 6 is a longitudinal sectional view after the same waterproof mechanism for a weighing apparatus is assembled.

As illustrated in FIG. 2, a waterproof mechanism for a weighing apparatus (hereinafter referred to as a "waterproof mechanism") 20 mainly includes a weighing pan 11, a pan boss circumferential member 13, a pan boss 14, a pan boss presser 18, and a pan receiver 16.

Figure 3:
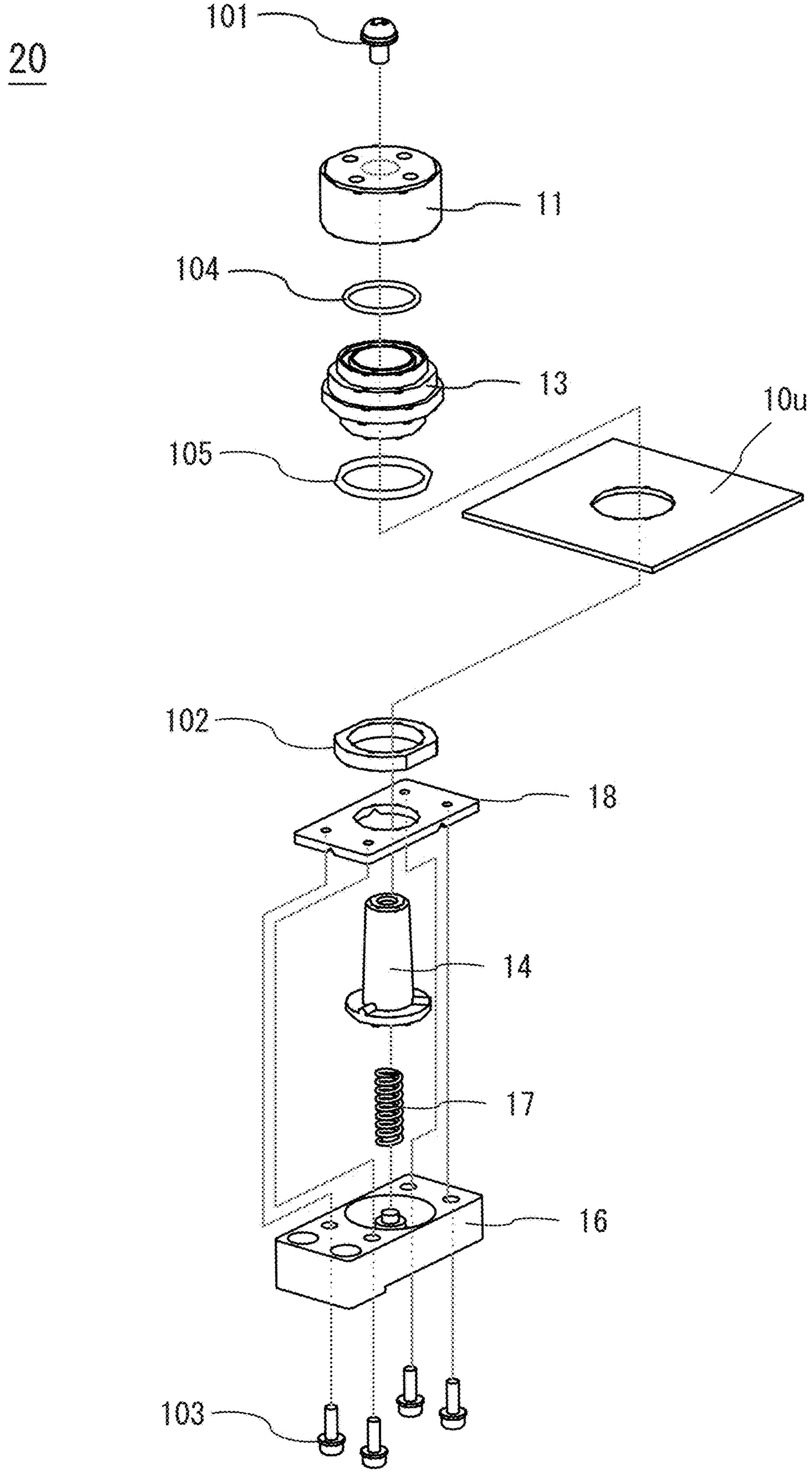
FIG. 3 is an exploded perspective view of the same waterproof mechanism for a weighing apparatus.

As illustrated in FIG. 3, the weighing pan 11 is fixed to the pan boss 14 by a screw 101. The pan boss circumferential member 13 is fixed under the upper case 10*u* by a nut 102. The pan boss 14 contains the elastic body 17, and is locked by the pan boss presser 18 and screws 103 and disposed on the pan receiver 16.

Figure 4:
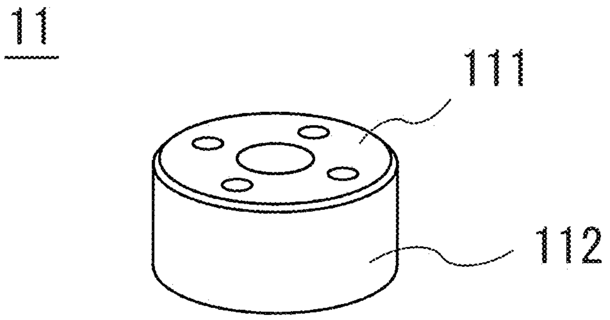
FIG. 4 is a perspective view of a weighing pan of the same waterproof mechanism for a weighing apparatus.

As illustrated in FIG. 4, the weighing pan 11 has a bottomed cylindrical shape as a whole, and includes a pan portion 111 having a flat plane, and a side wall portion 112 provided continuously downward from a rim of the pan portion 111. At a center of the pan portion 111, a screw hole is formed for the screw 101, and around the screw hole, a plurality of screw holes for attaching, for example, a tare to the pan portion 111 are formed. On an inner side surface 1121 (refer to FIG. 6) of the side wall portion 112, a female threaded portion that screw-fits a male threaded portion of the pan boss circumferential member 13 is formed in a circumferential direction (not illustrated). This female threaded portion is the "threaded portion" in the claims. The weighing pan 11 is preferably made of metal, for example, stainless steel or the like.

As illustrated in FIG. 5, the pan boss circumferential member 13 has a cylindrical shape as a whole, and has a hollow portion 131. Through the hollow portion 131, the pan boss 14 is inserted. The pan boss circumferential member 13 includes a first waterproofing portion 132, a pan guide portion 133, a second waterproofing portion 134, and a fixed portion 135, in order from the top, around the hollow portion 131. The pan boss circumferential member 13, that is, the hollow portion 131, the first waterproofing portion 132, the pan guide portion 133, the second waterproofing portion 134, and the fixed portion 135 are preferably made integrally of metal, for example, stainless steel or the like.

The first waterproofing portion 132 is a cylinder portion at an upper end portion of the pan boss circumferential member 13. On an upper surface 1321 (refer to FIG. 6) of the first waterproofing portion 132, a recess portion (hereinafter referred to as a "waterproofing recess portion") 1322 is formed in the circumferential direction, and in the waterproofing recess portion 1322, a ring-shaped packing is disposed as a waterproofing material 104. A diameter of the first waterproofing portion 132 is set to a size that (the side wall portion 112 of) the weighing pan 11 does not come into contact with the pan boss circumferential member 13 during weighing.

The pan guide portion 133 is a cylinder portion formed lower than the first waterproofing portion 132, and having a diameter larger than that of the first waterproofing portion 132. An outer diameter of the pan guide portion 133 is set to a size that substantially coincides with an inner diameter of the side wall portion 112 of the weighing pan 11. On a side surface 1331 (hereinafter referred to as a "first outer side surface." The first outer side surface 1331 is the "outer side surface" in the claims) of the pan guide portion 133, a male threaded portion that screw-fits the female threaded portion of the side wall portion 112 is formed (not illustrated) in the circumferential direction. This male threaded portion is the "threaded portion" in the claims.

The second waterproofing portion 134 is a cylinder portion formed lower than the pan guide portion 133, and having a diameter larger than that of the pan guide portion 133. A side surface of the second waterproofing portion 134 is hereinafter referred to as a "second outer side surface" 1341 (the second outer side surface 1341 is the "outer side surface" in the claims). On a lower surface 1342 (refer to FIG. 6) of the second waterproofing portion 134, a recess portion 1343 (refer to FIG. 6, hereinafter referred to as a "waterproofing recess portion") is formed in the circumferential direction, and in the waterproofing recess portion 1343, a ring-shaped packing is disposed as a waterproofing material 105 in a state of being crushed by an appropriate amount.

The fixed portion 135 is a lower end portion of the pan boss circumferential member 13, and is a cylinder portion formed lower than the second waterproofing portion 134 and smaller in diameter than the second waterproofing portion 134. The fixed portion 135 is inserted through the attaching hole of the device case 10, and fixed by the nut 102.

When the waterproof mechanism 20 is assembled, in the pan boss circumferential member 13, the fixed portion 135 is disposed inside the device case 10, and the second waterproofing portion 134, the pan guide portion 133, and the first waterproofing portion 132 are disposed outside the device case 10, and a lower surface 1342 of the second waterproofing portion 134 comes into contact with an upper surface of the device case 10 (the lower surface 1342 is hereinafter referred to as a "contact surface"). The pan boss 14 is disposed in the hollow portion 131, and the second waterproofing portion 134, the pan guide portion 133, and the first waterproofing portion 132 are disposed around the pan boss 14. The weighing pan 11 is supported by the pan boss 14 and disposed higher than the device case 10.

On the top and bottom of the pan boss circumferential member 13, the waterproofing materials 104 and 105 provided in the waterproofing recess portions 1322 and 1343 are respectively disposed. The waterproofing materials 104 and 105 may be, in place of the ring-shaped packings, for example, sealing materials such as gaskets and waterproof filters, or be viscoelastic materials. The waterproofing material 105 may be an adhesive agent with water resistance.

Figure 7:
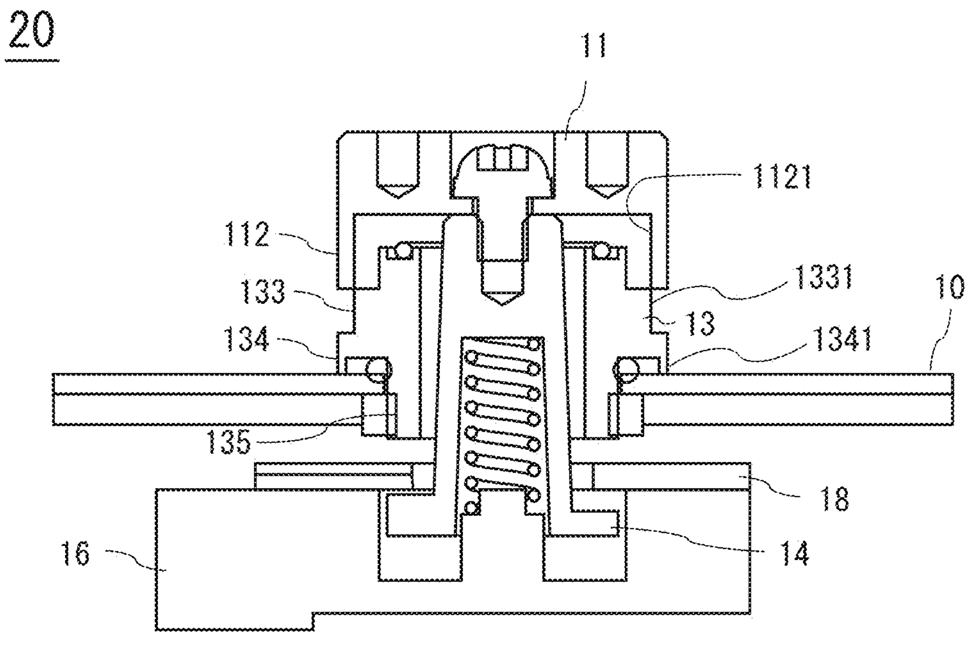
FIG. 7 is a longitudinal sectional view of the same waterproof mechanism for a weighing apparatus when an overload is applied.

Here, FIG. 6 also illustrates a state of the waterproof mechanism 20 during weighing. During weighing (normal times), the weighing pan 11 is disposed at a position not in contact with the pan boss circumferential member 13. On the other hand, FIG. 7 is a longitudinal sectional view of the waterproof mechanism 20 when an overload is applied at the time of weighing. When an overload is applied to the weighing pan 11, the weighing pan 11 sinks down, and the inner side surface 1121 of the side wall portion 112 of the pan interferes with the first outer side surface 1331 of the pan guide portion 133 of the pan boss circumferential member 13. In particular, the inner side surface 1121 and the first outer side surface 1331 have threaded portions, so that their threads interfere with each other, and sinking of the weighing pan 11 is prevented at an upper side of the pan guide portion 133. That is, the overload from the weighing pan 11 is transmitted to the pan boss circumferential member 13 and the device case 10, and is not easily transmitted to the mass sensor 12 inside the case.

Figure 8:
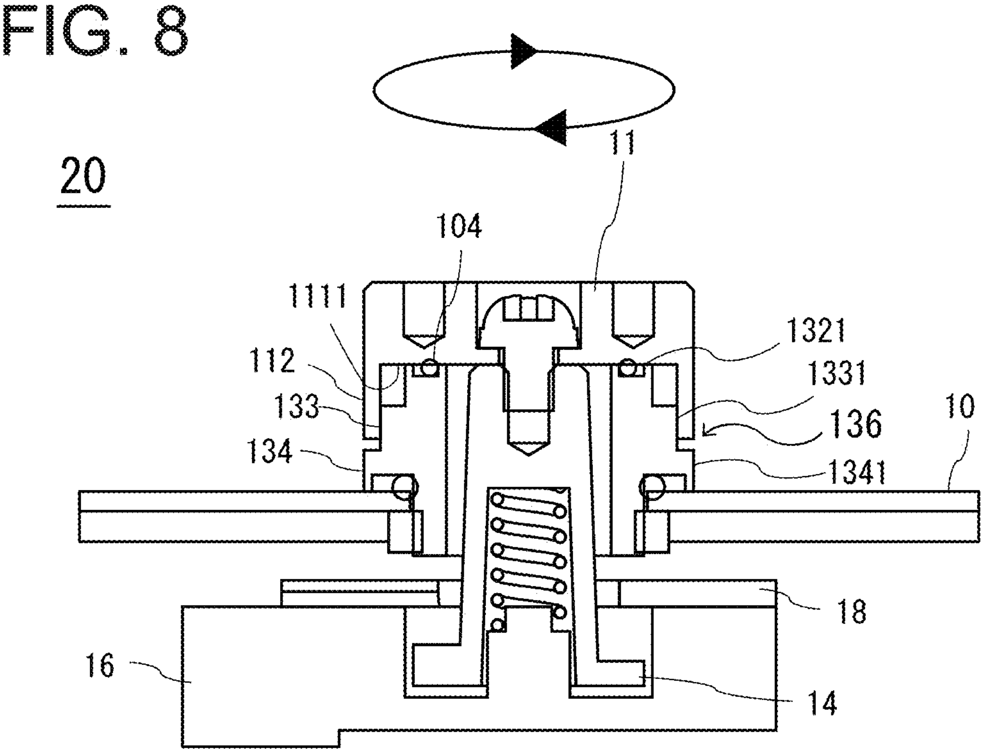
FIG. 8 is a longitudinal sectional view of the same waterproof mechanism for a weighing apparatus at the time of waterproofing.

Next, FIG. 8 is a longitudinal sectional view of the waterproof mechanism 20 at the time of waterproofing. When waterproofing the balance 1, the weighing pan 11 is turned in the horizontal direction, the female threaded portion of the side wall portion 112 is screw-fitted to the male threaded portion of the pan guide portion 133 of the pan boss circumferential member 13, and the weighing pan 11 is lowered downward by a prescribed amount.

As the weighing pan 11 is lowered by the prescribed amount, the side wall portion 112 comes into close contact with the pan boss circumferential member 13 in the circumferential direction, and the lower surface 1111 of the pan portion 111 of the weighing pan 11 comes into contact with the upper surface 1321 of the pan boss circumferential member 13 in a state of the lower surface 1111 crushing the waterproofing material 104 by an appropriate amount.

The prescribed amount is preferably set with a buffer of at least two times or more and three times or less the amount of sinking of the weighing pan 11 when subjected to an overload. For example, on the assumption that the amount of sinking of the weighing pan 11 when subjected to an overload (FIG. 7) is approximately 1 mm, the amount of sinking of the weighing pan 11 during waterproofing (FIG. 8) is set to be 2 mm. According to the setting of two times or more, the waterproof mechanism 20 can be prevented from entering a state of waterproofing when an overload is applied. In addition, according to the setting of three times or less, a projecting amount of the pan boss circumferential member 13 from the device case 10 is limited, and the construction becomes compact and is less susceptible to side impacts.

Here, since the second waterproofing portion 134 of the pan boss circumferential member 13 has a diameter set to be larger than that of the pan guide portion 133, between the first outer side surface 1331 and the second outer side surface 1341, a step 136 is provided. When the weighing pan 11 is lowered over the prescribed amount, the upper surface of the second waterproofing portion 134 interferes with the lower end portion of the side wall portion 112, and restricts the pan from being further lowered, and prevents the waterproofing material 104 disposed on the upper surface 1321 of the pan boss circumferential member 13 from being excessively crushed.

As described above, according to the waterproof mechanism 20 of the present embodiment, when the weighing pan 11 is lowered downward by the prescribed amount, the weighing pan 11 directly engages with a component (pan boss circumferential member 13) of the device case 10. Then, waterproofing in the circumferential direction is provided by the upper and lower waterproofing portions (the first waterproofing portion 132 and the second waterproofing portion 134) formed on the pan boss circumferential member 13, and water intrusion into the inside (mass sensor 12) of the device case 10 is prevented.

The waterproofing described above is realized just by turning (screwing) the weighing pan 11 horizontally. Therefore, a dedicated jig for bringing the balance into a waterproofed state is not necessary. In addition, the weighing pan 11 and the pan boss circumferential member 13 are made of metal, and a diaphragm that becomes a cause of instability of the weighed value is not used. The waterproof mechanism 20 does not use a diaphragm, so that the apparatus width can be reduced, and this is preferable in a balance to be installed into a production line.

In addition, according to the waterproof mechanism 20 of the present embodiment, by making the waterproofing recess portion 1322 be open upward, a user can replace the waterproofing material 104 that is easily worn by contact with the weighing pan 11 moving up and down, without relying on a vendor. By providing the step 136 on the pan boss circumferential member 13, the waterproofing material 104 is prevented from being excessively crushed, so that waterproofing of the first waterproofing portion 132 properly functions.

Further, the waterproof mechanism 20 of the present embodiment shares components with and is combined with a known overload prevention mechanism constituted of the pan boss 14, the pan receiver 16, the elastic body 17, and the pan boss presser 18. Furthermore, the waterproof mechanism 20 of the present embodiment has a configuration that causes interference between the pan boss circumferential member 13 and the weighing pan 11, so that in this respect, the function of overload prevention is enhanced.

The waterproof mechanism 20 of the present embodiment also functions as a stopper at the time of transportation. FIG. 8 also illustrates a state of the waterproof mechanism 20 during transportation of the balance 1. At the time of transportation, in a general balance, the weighing pan is a movable portion, so that the weighing pan is removed from the device case and packed separately from the device case. The device case is packed in a state where a junction portion (such as the pan boss) with the weighing pan is heavily protected. On the other hand, in the balance 1 of the present embodiment, by bringing into the state illustrated in FIG. 8, the pan boss circumferential member 13 serves as a stopper of the weighing pan 11, and the side wall portion 112 of the weighing pan 11 functions like a protection cap of the junction portion (pan boss 14), so that there is no longer the need to pack the weighing pan 11 separately or to pack the device case 10 securely.

2. Second Embodiment

Figure 9:
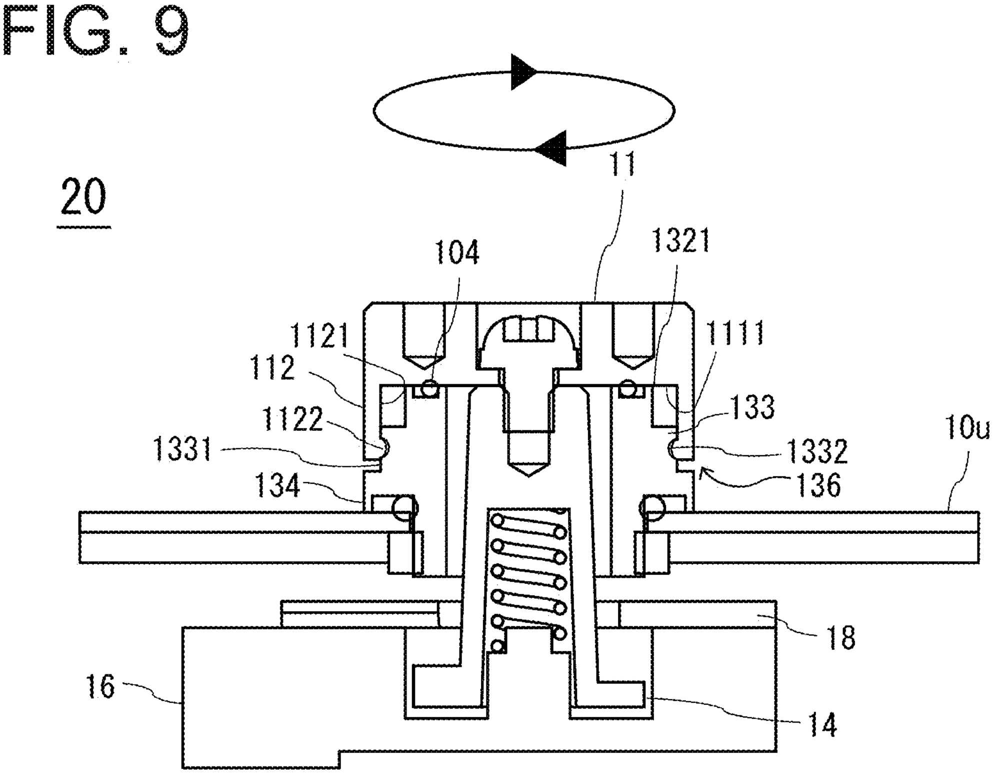
FIG. 9 is a longitudinal sectional view of a waterproof mechanism for a weighing apparatus according to a second embodiment of the present invention at the time of waterproofing.

FIG. 9 is a longitudinal sectional view of a waterproof mechanism for a weighing apparatus according to a second embodiment at the time of waterproofing. In the waterproof mechanism 20 of the first embodiment, the weighing pan 11 and the pan boss circumferential member 13 are screw-engaged with each other, however, in the waterproof mechanism 20 of the second embodiment, the weighing pan 11 and the pan boss circumferential member 13 are configured to make concavo-convex-engaged (be hook-engaged) with each other.

The weighing pan 11 includes, in place of the female threaded portion, a projection portion 1122 (hereinafter referred to as an "engagement projection portion") in the circumferential direction at a lower end portion of the inner side surface 1121 of the side wall portion 112. In the present embodiment, it is preferable that the weighing pan 11 is made of metal or synthetic resin, and has appropriate elasticity. The pan boss circumferential member 13 includes a recess portion 1332 (hereinafter referred to as an "engagement recess portion") in the circumferential direction at a position a prescribed amount below the upper surface 1321 on the first outer side surface 1331 of the pan guide portion 133. These engagement projection portion 1122 and engagement recess portion 1332 are the "engagement portions" in the claims. The shapes of the engagement portions are not limited to the illustrated shapes, and can be variously modified.

A state of the waterproof mechanism 20 of the present embodiment at the time of weighing (normal times) is the same as in the first embodiment (FIG. 6). When an overload is applied to the weighing pan 11, the engagement projection portion 1122 formed at a lower end portion of the side wall portion 112 interferes with the first outer side surface 1131 of the pan guide portion 133 of the pan boss circumferential member 13, and sinking of the weighing pan 11 is prevented by an amount corresponding to frictional resistance generated by the engagement projection portion 1122.

Then, at the time of waterproofing (FIG. 9), when the weighing pan 11 is strongly lowered, the interference between the engagement projection portion 1122 and the first outer side surface 1131 is released by the elasticity of the pan, and the side wall portion 112 is lowered by being guided by the pan guide portion 133. As the weighing pan 11 lowers to the prescribed amount, the engagement projection portion 1122 of the weighing pan 11 is hook-engaged with the engagement recess portion 1332 of the pan boss circumferential member 13, and the lower surface 1111 of the pan portion 111 of the weighing pan 11 comes into contact with the upper surface 1321 of the pan boss circumferential member 13 in a state of the lower surface 1111 crushing the waterproofing material 104 by an appropriate amount.

As described above, also according to the waterproof mechanism 20 of the present embodiment, when the weighing pan 11 is lowered by the prescribed amount, the weighing pan 11 directly engages with a component (pan boss circumferential member 13) of the device case 10. Then, waterproofing in the circumferential direction is provided by the upper and lower waterproofing portions (the first waterproofing portion 132 and the second waterproofing portion 134) formed on the pan boss circumferential member 13, and accordingly, water intrusion into the mass sensor 12 is prevented.

The waterproofing described above is realized just by causing concavo-convex engagement of the weighing pan 11. Therefore, a dedicated jig for bringing the balance into a waterproofed state is not required. Further, the waterproof mechanism 20 of the present embodiment also does not use a diaphragm.

Even in the present embodiment, the waterproofing material 104 at the upper side can be easily replaced, and due to the step 136 between the first outer side surface 1331 and the second outer side surface 1341, waterproofing by the first waterproofing portion 132 properly functions.

The present embodiment is also configured so as to be combined with a known overload prevention mechanism, and includes a configuration that causes interference between the pan boss circumferential member 13 and the weighing pan 11, and in this respect, the function of overload prevention is enhanced.

In the present embodiment as well, the pan boss circumferential member 13 serves as a stopper of the weighing pan 11, and the side wall portion 112 of the weighing pan 11 functions like a protective cap of the junction portion (pan boss 14), so that at the time of transportation, there is no need to pack the weighing pan 11 separately or to pack the device case 10 securely.

3. Modification 1

Figure 10:
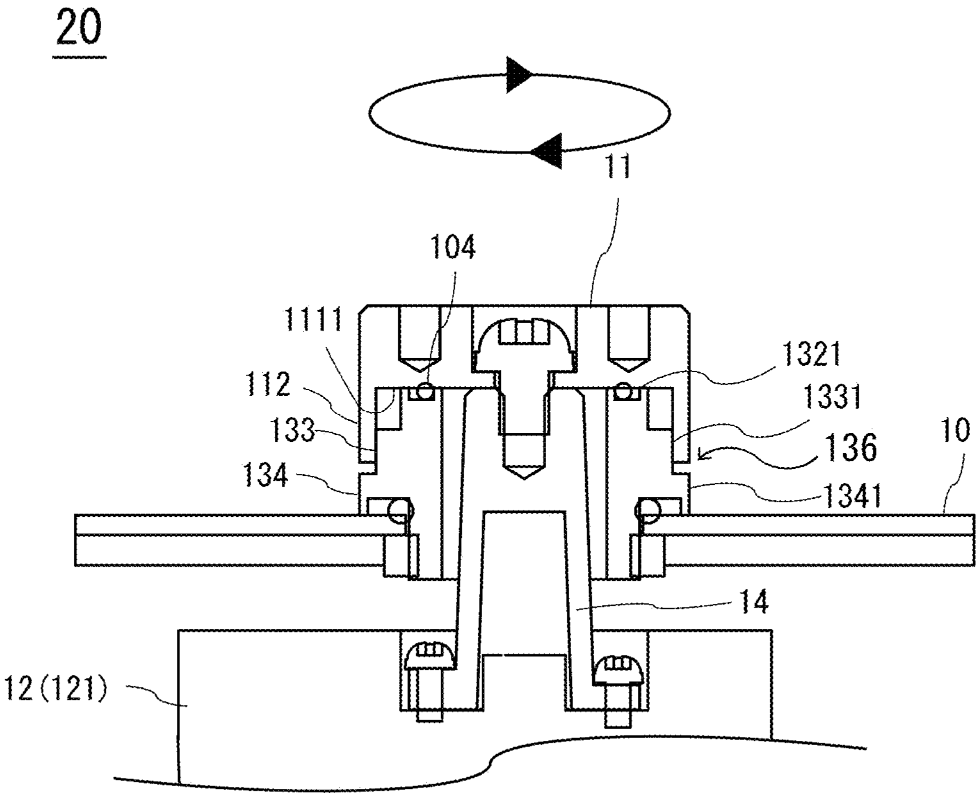
FIG. 10 is a longitudinal sectional view of a waterproof mechanism for a weighing apparatus according to modification 1 of the embodiments.

In the embodiments described above, the waterproof mechanism 20 includes the elastic body 17 so as to be combined with a known overload prevention mechanism, however, as a waterproof mechanism, the elastic body 17 is an optional element. FIG. 10 is a longitudinal sectional view of a waterproof mechanism for a weighing apparatus according to Modification 1 of the embodiments, and illustrates a case where Modification 1 is applied to the first embodiment. When the waterproof mechanism 20 is not combined with a known overload prevention mechanism, the pan boss 14 may be directly fixed to the floating frame side of the mass sensor 12 (Roberval mechanism 121). The same applies to the second embodiment.

4. Modification 2

In the first embodiment, as the "threaded portions", a female threaded portion is provided on the weighing pan 11 side, and a male threaded portion is provided on the pan boss circumferential member 13 side, however, a configuration is also possible in which a male threaded portion is provided on the weighing pan 11 side, and a female threaded portion is provided on the pan boss circumferential member 13 side (not illustrated). This mode also brings about the same effect as in the first embodiment.

5. Modification 3

In the second embodiment, as the "engagement portions," the engagement projection portion 1122 is provided on the weighing pan 11 side, and the engagement recess portion 1332 is provided on the pan boss circumferential member 13 side, however, a configuration is also possible in which an engagement recess portion is provided on the weighing pan 11 side, and an engagement projection portion is provided on the pan boss circumferential member 13 side (not illustrated). In this case, although the interference in the case with an overload applied to the weighing pan 11 at the time of weighing is reduced, the same effect as in the second embodiment is obtained as the waterproof mechanism.

As above, preferred embodiments and modifications of an overload waterproof mechanism of the present invention have been described, however, these are just examples of the present invention, and the embodiments and modifications can be combined based on the knowledge of a person skilled in the art, and such a combined embodiment is also included in the scope of the present invention.

REFERENCE SIGNS LIST

1 Balance (weighing apparatus)
10 Device case
11 Weighing pan
111 Pan portion
1111 Lower surface of pan portion
112 Side wall portion
1121 Inner side surface
1122 Engagement projection portion (engagement portion)
12 Mass sensor
13 Pan boss circumferential member
131 Hollow portion
132 First waterproofing portion
1321 Upper surface of pan boss circumferential member
133 Pan guide portion
1331 First outer side surface
1332 Engagement recess portion (engagement portion)
134 Second waterproofing portion
1341 Second outer side surface
1342 Contact surface
135 Fixed portion
136 Step
14 Pan boss
16 Pan receiver
17 Elastic body
18 Pan boss presser
20 Waterproof mechanism for weighing apparatus
104, 105 Waterproofing material

The invention claimed is:

1. A waterproof mechanism for a weighing apparatus, comprising:
- a weighing pan;
- a mass sensor to which a load of the weighing pan is transmitted;
- a device case configured to house the mass sensor;
- a pan boss configured to support the weighing pan higher than the device case; and
- a pan boss circumferential member provided in a circumferential direction of the pan boss and fixed to the device case, wherein
- the weighing pan includes a side wall portion provided continuously downward from a pan portion rim, and
- when the weighing pan is lowered downward by a prescribed amount, the side wall portion engages with the pan boss circumferential member in the circumferential direction, and a lower surface of the pan portion and an upper surface of the pan boss circumferential member come into contact with each other.

2. The waterproof mechanism for a weighing apparatus according to claim 1, wherein on the upper surface of the pan boss circumferential member and a contact surface of the pan boss circumferential member which comes into contact with the device case, waterproofing materials are respectively disposed in the circumferential direction.

3. The waterproof mechanism for a weighing apparatus according to claim 1, wherein an inner side surface of the side wall portion and an outer side surface of the pan boss circumferential member include threaded portions that engage with each other, and the side wall portion and the pan boss circumferential member make the engagement by turning the weighing pan in a screw direction.

4. The waterproof mechanism for a weighing apparatus according to claim 1, wherein a lower end portion of an inner side surface of the side wall portion and an outer side surface of the pan boss circumferential member include engagement portions configured to make concavo-convex engagement with each other, and the side wall portion and the pan boss circumferential member make the engagement by their concavity and convexity.

5. The waterproof mechanism for a weighing apparatus according to claim 2, wherein an outer side surface of the pan boss circumferential member includes a first outer side surface configured to guide lowering of the side wall portion, and a second outer side surface having a diameter larger than that of the first outer side surface and positioned lower than the first outer side surface, and by a step between the first outer side surface and the second outer side surface, the lowering of the side wall portion is restricted, and the waterproofing material is prevented from being excessively crushed.

6. The waterproof mechanism for a weighing apparatus according to claim 3, wherein when an overload is applied to the weighing pan, a lower end portion of the side wall portion interferes with the outer side surface of the pan boss circumferential member and prevents the overload from being transmitted to the mass sensor.

7. The waterproof mechanism for a weighing apparatus according to claim 1, wherein the waterproof mechanism for a weighing apparatus includes an elastic body configured to bias the pan boss in a direction away from a pan receiver of the pan boss between the pan boss and the pan receiver, and the elastic body is combined with an overload prevention mechanism configured to space the pan boss away from the pan receiver to release the load.

8. The waterproof mechanism for a weighing apparatus according to claims 1, wherein when the weighing pan is lowered by the prescribed amount and the engagement is made, the weighing pan is fixed to the pan boss circumferential member, and the pan boss circumferential member serves as a stopper of the weighing pan at the time of transportation of the apparatus.

9. The waterproof mechanism for a weighing apparatus according to claim 4, wherein when an overload is applied to the weighing pan, a lower end portion of the side wall portion interferes with the outer side surface of the pan boss circumferential member and prevents the overload from being transmitted to the mass sensor.

10. The waterproof mechanism for a weighing apparatus according to claim 2, wherein the waterproof mechanism for a weighing apparatus includes an elastic body configured to bias the pan boss in a direction away from a pan receiver of the pan boss between the pan boss and the pan receiver, and the elastic body is combined with an overload prevention mechanism configured to space the pan boss away from the pan receiver to release the load.

11. The waterproof mechanism for a weighing apparatus according to claim 3, wherein the waterproof mechanism for a weighing apparatus includes an elastic body configured to bias the pan boss in a direction away from a pan receiver of the pan boss between the pan boss and the pan receiver, and the elastic body is combined with an overload prevention mechanism configured to space the pan boss away from the pan receiver to release the load.

12. The waterproof mechanism for a weighing apparatus according to claim 4, wherein the waterproof mechanism for a weighing apparatus includes an elastic body configured to bias the pan boss in a direction away from a pan receiver of the pan boss between the pan boss and the pan receiver, and the elastic body is combined with an overload prevention mechanism configured to space the pan boss away from the pan receiver to release the load.

13. The waterproof mechanism for a weighing apparatus according to claim 5, wherein the waterproof mechanism for a weighing apparatus includes an elastic body configured to bias the pan boss in a direction away from a pan receiver of the pan boss between the pan boss and the pan receiver, and the elastic body is combined with an overload prevention mechanism configured to space the pan boss away from the pan receiver to release the load.

14. The waterproof mechanism for a weighing apparatus according to claim 6, wherein the waterproof mechanism for a weighing apparatus includes an elastic body configured to bias the pan boss in a direction away from a pan receiver of the pan boss between the pan boss and the pan receiver, and the elastic body is combined with an overload prevention mechanism configured to space the pan boss away from the pan receiver to release the load.

15. The waterproof mechanism for a weighing apparatus according to claim 2, wherein when the weighing pan is lowered by the prescribed amount and the engagement is made, the weighing pan is fixed to the pan boss circumferential member, and the pan boss circumferential member serves as a stopper of the weighing pan at the time of transportation of the apparatus.

16. The waterproof mechanism for a weighing apparatus according to claim 3, wherein when the weighing pan is lowered by the prescribed amount and the engagement is made, the weighing pan is fixed to the pan boss circumferential member, and the pan boss circumferential member serves as a stopper of the weighing pan at the time of transportation of the apparatus.

17. The waterproof mechanism for a weighing apparatus according to claim 4, wherein when the weighing pan is lowered by the prescribed amount and the engagement is made, the weighing pan is fixed to the pan boss circumferential member, and the pan boss circumferential member serves as a stopper of the weighing pan at the time of transportation of the apparatus.

18. The waterproof mechanism for a weighing apparatus according to claim 5, wherein when the weighing pan is lowered by the prescribed amount and the engagement is made, the weighing pan is fixed to the pan boss circumferential member, and the pan boss circumferential member serves as a stopper of the weighing pan at the time of transportation of the apparatus.

19. The waterproof mechanism for a weighing apparatus according to claim 6, wherein when the weighing pan is lowered by the prescribed amount and the engagement is made, the weighing pan is fixed to the pan boss circumferential member, and the pan boss circumferential member serves as a stopper of the weighing pan at the time of transportation of the apparatus.

20. The waterproof mechanism for a weighing apparatus according to claim 7, wherein when the weighing pan is lowered by the prescribed amount and the engagement is made, the weighing pan is fixed to the pan boss circumferential member, and the pan boss circumferential member serves as a stopper of the weighing pan at the time of transportation of the apparatus.

* * * * *